(12) United States Patent
Takahashi et al.

(10) Patent No.: US 9,738,844 B2
(45) Date of Patent: Aug. 22, 2017

(54) METHOD FOR PRODUCING MOLDED SOLID FUEL

(71) Applicant: KOBE STEEL, LTD., Kobe-shi (JP)

(72) Inventors: Yoichi Takahashi, Takasago (JP); Takuo Shigehisa, Takasago (JP); Tsuyoshi Adachi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 16 days.

(21) Appl. No.: 14/767,753

(22) PCT Filed: Mar. 27, 2014

(86) PCT No.: PCT/JP2014/059035
§ 371 (c)(1),
(2) Date: Aug. 13, 2015

(87) PCT Pub. No.: WO2014/174985
PCT Pub. Date: Oct. 30, 2014

(65) Prior Publication Data
US 2015/0376529 A1 Dec. 31, 2015

(30) Foreign Application Priority Data
Apr. 24, 2013 (JP) .................. 2013-091396

(51) Int. Cl.
*C10L 5/02* (2006.01)
*C10L 5/06* (2006.01)
(Continued)

(52) U.S. Cl.
CPC ........ *C10L 5/08* (2013.01); *C10L 5/04* (2013.01); *C10L 5/361* (2013.01); *C10L 9/00* (2013.01);
(Continued)

(58) Field of Classification Search
CPC ... B29C 43/00; B29C 43/52; B29C 2043/522; B29C 2043/043; B29C 2035/1616;
(Continued)

(56) References Cited

U.S. PATENT DOCUMENTS 3,907,486 A * 9/1975 Kennedy ............ B30B 15/34
425/237
2005/0097814 A1 5/2005 Sugita et al.
2012/0291342 A1* 11/2012 Sugita ..................... C10L 5/08
44/594

FOREIGN PATENT DOCUMENTS

CN 1629261 A 6/2005
JP 55-066987 A 5/1980
(Continued)

OTHER PUBLICATIONS

International Search Report and Written Opinion issued on Jun. 24, 2014 for PCT/JP2014/059035 filed on Mar. 27, 2014.

*Primary Examiner* — Pamela H Weiss
(74) *Attorney, Agent, or Firm* — Oblon, McClelland, Maier & Neustadt, L.L.P.

(57) ABSTRACT

A method of manufacturing a molded solid fuel including: a pulverization for pulverizing low-grade coal; a mixing for obtaining a slurry by mixing the pulverized low-grade coal and a solvent oil; a dehydration for obtaining a dehydrated slurry by heating and dehydrating the slurry; a solid-liquid separation for obtaining a cake by separating the solvent oil from the dehydrated slurry; a drying for obtaining powdery modified coal by heating the cake and further separating the solvent oil from the cake; and a molding for pressurizing and molding the powdery modified coal by using a molding machine, without the addition/mixture of a binder. In the molding, a coolant is sprayed onto the surface of the molding machine, and the surface temperature of the molding machine is kept equal to or below 100° C.

10 Claims, 2 Drawing Sheets

(51) Int. Cl.
*B29C 67/00* (2017.01)
*C10L 5/08* (2006.01)
*C10L 5/04* (2006.01)
*C10L 9/00* (2006.01)
*C10L 5/36* (2006.01)
*C10L 9/10* (2006.01)

(52) U.S. Cl.
CPC ............ *C10L 9/10* (2013.01); *C10L 2200/043* (2013.01); *C10L 2290/06* (2013.01); *C10L 2290/08* (2013.01); *C10L 2290/18* (2013.01); *C10L 2290/24* (2013.01); *C10L 2290/28* (2013.01); *C10L 2290/30* (2013.01); *C10L 2290/32* (2013.01); *C10L 2290/546* (2013.01); *C10L 2290/547* (2013.01); *Y02E 50/30* (2013.01)

(58) Field of Classification Search
CPC . B29C 2043/527; B30B 9/328; B30B 9/3035; Y10S 100/905; Y10S 100/906; Y10S 100/908; C10L 2290/30; C10L 2290/32; C10L 5/08; C10L 9/10; C10L 5/361; C10L 9/00; C10L 5/04; C10L 2290/28; C10L 2200/043; C10L 2290/546; C10L 2290/24; C10L 2290/06; C10L 2290/547; C10L 2290/08; C10L 2290/18; Y02E 50/30
USPC .... 264/109, 556; 100/38, 92, 306, 307, 308, 100/309, 310; 425/407
See application file for complete search history.

(56) References Cited

FOREIGN PATENT DOCUMENTS

| JP | 57-151695 A | | 9/1982 | |
|---|---|---|---|---|
| JP | 57-151696 A | | 9/1982 | |
| JP | 57151696 A | * | 9/1982 | |
| JP | 10-043894 A | | 2/1998 | |
| JP | WO 2010044376 A1 | * | 4/2010 | ............... C10L 5/08 |
| JP | 2010-116544 A | | 5/2010 | |
| JP | 2010-172840 A | | 8/2010 | |

* cited by examiner

METHOD FOR PRODUCING MOLDED SOLID FUEL

TECHNICAL FIELD

The present invention relates to a method of manufacturing a molded solid fuel from low-grade coal such as brown coal and subbituminous coal.

BACKGROUND ART

A manufacturing method described in PTL 1 (Japanese Unexamined Patent Application Publication No. Sho57 (1982)-151696) has been known as a method of manufacturing molded coal through pressure-molding of powdery material coal. In this manufacturing method, dried powdery molding material coal and a binder such as coal-tar pitch are blended, and such a blend is pressure-molded to produce molded coal. Specifically, in this manufacturing method, a water coating is formed on a mold surface of a molding machine by water spray or steam blowing, and then the blend is pressure-molded.

This manufacturing method described in PTL 1 is intended to prevent insufficient removal of molded coal from the mold. In the manufacturing method, therefore, a water coating is formed on the mold surface, thereby wettability of the binder to the mold surface is extremely lowered. Accordingly, adhesive strength of the binder is also lowered. As a result, insufficient removal of molded coal from the mold can be prevented.

In the manufacturing method described in PTL 1, however, the binder must be mixed in the powdery material coal for pressure molding, and thus lower molding cost has been an issue.

A manufacturing method described in PTL 2 (Japanese Unexamined Patent Application Publication No. 2010-116544) has been known as a method of manufacturing molded coal by pressure-molding powdery material coal with no binder.

The method of manufacturing the molded solid fuel described in PTL 2 includes a mixing step of mixing a mixed oil containing a heavy oil and a solvent oil with pulverized low-grade coal to produce a slurry, an evaporation step of heating and dehydrating the slurry to produce a dehydrated slurry, a solid-liquid separation step of separating the solvent oil from the dehydrated slurry to produce a cake, a drying step of heating the cake to further separate the solvent oil from that cake to produce powdery upgraded coal, a humidification step of humidifying the powdery upgraded coal to produce humidified upgraded coal having a water content of 3 to 10 wt %, and a molding step of pressure-molding the powdery, humidified upgraded coal by a double-roll molding machine to produce a molded solid fuel in a form of briquettes.

In the manufacturing method described in PTL 2, although a molded material having high strength is produced due to water addition in the humidification step, when a powdery coal having a low carbonization level and a low bulk density is molded, the strength improving effect is not sufficiently exhibited, leaving room for further improvement.

Specifically, in the manufacturing method described in PTL 2, the powdery upgraded coal to be pressure-molded has a high temperature of 100° C. or higher after the drying step. In addition, friction occurs between each roll surface of the double-roll molding machine and the powdery upgraded coal during the pressure molding by the double-roll molding machine. As a result, a surficial portion of the molded solid fuel has even higher temperature, leading to a large temperature difference between the surficial portion and the inside thereof. Hence, the molded solid fuel has internal strain due to the temperature difference, and is reduced in strength. In this regard, the manufacturing method described in PTL 2 leaves room for improvement.

In the manufacturing method described in PTL 2, water added in the humidification step evaporates from the surficial portion of the molded solid fuel during the pressure molding by the double-roll molding machine. As a result, a large difference in moisture percentage occurs between the surficial portion and the inside of the molded solid fuel. Hence, the molded solid fuel is reduced in strength due to the difference in moisture percentage. In this regard, the manufacturing method also leaves room for improvement.

CITATION LIST

Patent Literature

PTL 1: Japanese Unexamined Patent Application Publication No. Sho57(1982)-151696.
PTL 2: Japanese Unexamined Patent Application Publication No. 2010-116544.

SUMMARY OF INVENTION

Technical Problem

An object of the invention is therefore to provide a method of manufacturing a molded solid fuel having high strength from low-grade coal in production of the fuel from low-grade coal.

Solution to Problem

To achieve the object, the invention of the application adopts the following measures.

According to a feature of the invention, there is provided a method of manufacturing a molded solid fuel, the method including: a pulverization step of pulverizing low-grade coal; a mixing step of mixing the pulverized low-grade coal and a solvent oil to produce a slurry; a dehydration step of heating and dehydrating the slurry to produce a dehydrated slurry; a solid-liquid separation step of separating the solvent oil from the dehydrated slurry to produce a cake; a drying step of heating the cake to further separate the solvent oil from the cake to produce powdery upgraded coal; and a molding step of pressure-molding the powdery upgraded coal by a molding machine without adding and/or mixing a binder, in which in the molding step, a coolant is sprayed onto a surface of the molding machine to cool the surface, thereby surface temperature of the molding machine is maintained to 100° C. or lower.

According to another feature of the invention, the molding machine is accommodated in a semi-sealed molding chamber having an opened carry-in part for the powdery upgraded coal produced in the drying step and an opened carry-out part for the molded solid fuel provided from the molding machine, and humidity in the molding chamber is maintained to 85% or more.

According to yet another feature, water is used as the coolant in the method of manufacturing the molded solid fuel.

According to yet another feature of the invention, the molding step is performed with a coolant spray device that sprays the coolant onto the surface of the molding machine, and with a material supply line along which the powdery upgraded coal produced in the drying step is carried as a molding material to the molding machine.

According to yet another feature of the invention, the coolant spray device is accommodated in the molding chamber.

According to yet another feature of the invention, a sieving device sieves the molded solid fuel provided from the molding machine and the powdery upgraded coal as a non-molded material and separates them from each other, and the powdery upgraded coal as undersize powder provided from the sieving device is returned to the material supply line along a recycle line.

Advantageous Effects of Invention

In the method of manufacturing the molded solid fuel according to the invention, the coolant is sprayed onto the surface of the molding machine to cool the surface so that the surface temperature of the molding machine is maintained to 100° C. or lower. Consequently, the molded solid fuel has a small temperature difference between the surficial portion and the inside thereof compared with the case where no coolant is sprayed, leading to suppression of occurrence of strain. As a result, a molded solid fuel having high strength can be provided.

In the method of manufacturing the molded solid fuel according to the invention, as described above, the surface temperature of the molding machine is maintained to 100° C. or lower, and the molding step is performed in the semi-sealed molding chamber while the inside of the molding chamber is humidified to maintain the humidity in the molding chamber to 85% or more. Consequently, in the molded solid fuel, occurrence of strain is suppressed as described above, and evaporation of water is suppressed due to the humidification. The molded solid fuel therefore has a small difference in moisture percentage between the surficial portion and the inside thereof, and is thus homogenized. As a result, a molded solid fuel having high strength can be provided.

In the method of manufacturing the molded solid fuel according to the invention, water is sprayed as the coolant onto the surface of the molding machine. Water has high specific heat and high evaporative latent heat and thus has a high cooling effect, and furthermore is inexpensive; hence, water is preferred as the coolant. The powdery upgraded coal is produced through dehydrating low-grade coal in oil as described above, and has a hydrophobic (lipophilic) surface. Hence, for example, an organic coolant such as lubricating oil is compatible with the powdery upgraded coal, which impairs nipping of the powdery upgraded coal between the rolls of the molding machine. Consequently, a molded material having high strength may not be provided. Using water as the coolant decreases a nip angle (biting angle into the molding machine) and improves nipping of the coal between the rollers. Consequently, a molded material having further high strength can be provided.

DESCRIPTION OF EMBODIMENTS

Figure 1:
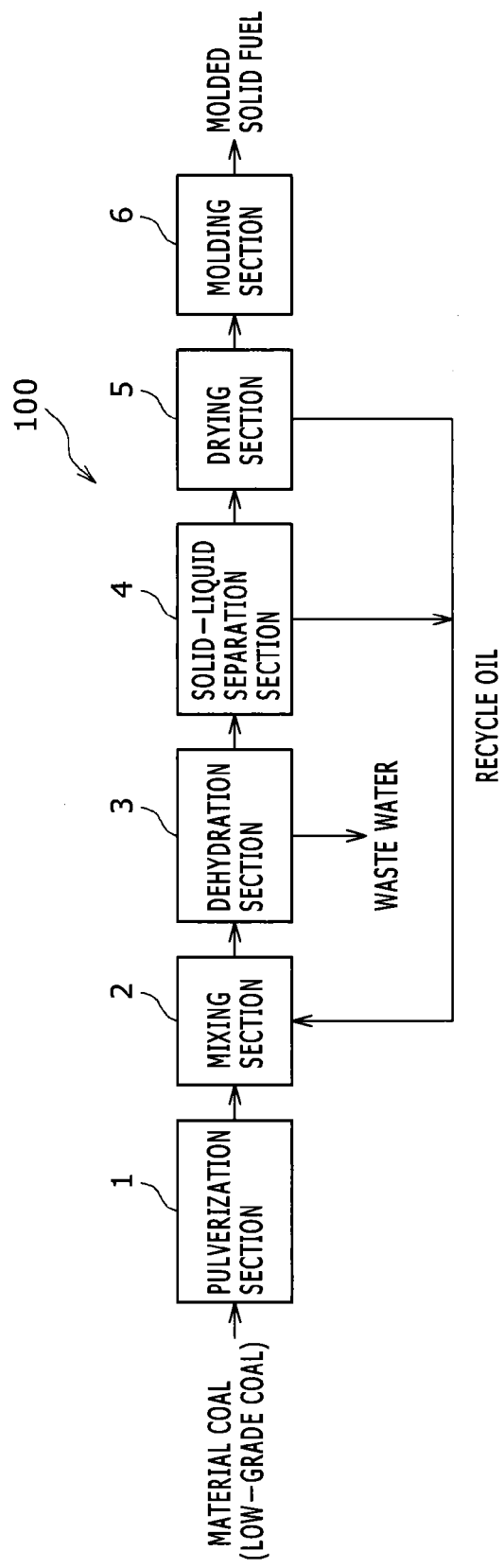
FIG. 1 is a block diagram illustrating an overall configuration of a manufacturing apparatus of a molded-solid fuel used in an embodiment of the manufacturing method of the invention.

Hereinafter, the invention is described in detail with Examples. FIG. 1 is a block diagram illustrating an overall configuration of a manufacturing apparatus of a molded-solid fuel used in an embodiment of the manufacturing method of the invention.

As illustrated in FIG. 1, a manufacturing apparatus 100 of a molded solid fuel includes a pulverization section 1 that pulverizes low-grade coal (material coal), a mixing section 2 that mixes the pulverized low-grade coal and a solvent oil to produce a slurry, a dehydration section 3 that heats and dehydrates the slurry to produce a dehydrated slurry, a solid-liquid separation section 4 that separates the solvent oil from the dehydrated slurry to produce a cake, a drying section 5 that heats the cake to further separate the solvent oil from the cake to produce powdery upgraded coal, and a molding section 6 that pressure-molds the powdery upgraded coal without adding and/or mixing a binder to produce a molded solid fuel in a form of briquettes. A manufacturing method of the molded solid fuel according to this embodiment, the method being performed by the manufacturing apparatus 100, is now described in detail.

Pulverization Step

First, low-grade coal (material coal) is supplied to the pulverization section 1 and pulverized therein. The pulverization section 1 is configured of a pulverizer. The pulverized low-grade coal has a particle diameter of, for example, about 0.05 to 3 mm, and an average particle diameter of about several hundred micrometers. The low-grade coal as the material coal contains water in a moisture percentage of 25 to 65 mass %, for example, and is desirably dehydrated to promote its use. Such low-grade coal includes brown coal and subbituminous coal. Brown coal includes Victorian coal, Mulia coal, North Dakota coal, and Bulga coal. Subbituminous coal includes west Banco charcoal, Binungan charcoal, Saramangau charcoal, and Ekokoru charcoal.

Mixing Step

Subsequently, the mixing section 2 mixes a solvent oil and the pulverized low-grade coal to produce a slurry (a fluid mixture of the pulverized low-grade coal and the solvent oil). A mass ratio of the pulverized low-grade coal to the solvent oil (pulverized low-grade coal/solvent oil) is preferably 0.5 or more, more preferably 1.0 or more, and further preferably 1.5 or more, and is preferably 4 or less with reference to dried or moisture-free coal. The mixing section 2 is configured of a mixing bath for mixing the pulverized low-grade coal and the solvent oil, and a stirrer provided in the mixing bath. For example, a low-boiling oil is used as the solvent oil to be a heating medium for dehydration in light of handling ability of a slurry, ease of penetration into the pores of the low-grade coal, and the like. Petroleum-derived oil having a boiling point of 100 to 300° C. is recommended to be used in consideration of stability at the water evaporation temperature. Examples of the petroleum-derived oil include kerosene, light oil, and heavy oil. The petroleum-derived oil may be a mixed oil containing the solvent oil and a heavy oil that is added as necessary. The heavy oil includes an oil having a boiling point of 300° C. or higher. Specific examples of the heavy oil include asphalt and tar. Although the composition of a recycle oil returned to the mixing section 2 largely includes a solvent oil content, the recycle oil may include a slight amount of heavy oil content.

Dehydration Step

Subsequently, the dehydration section 3 heats and dehydrates the slurry produced in the mixing section 2 to produce a dehydrated slurry. The dehydration section 3 is configured of a preheater for preheating the slurry produced in the mixing section 2, and an evaporator for further heating the preheated slurry. In the evaporator, the slurry is dehydrated in oil at a pressurizing condition of 0.2 to 0.5 MPa and a heating condition of 120 to 160° C. Water contained in the low-grade coal in the slurry is drained as waste water from the evaporator.

Solid Separation Step

Subsequently, the solid-liquid separation section 4 separates the solvent oil from the dehydrated slurry to produce a muddy cake. The solid-liquid separation section 4 is configured of a solid-liquid separator. For example, a centrifuge, which separates the dehydrated slurry into the cake and the solvent oil by centrifugal separation, is used as the solid-liquid separator. Another type of solid-liquid separator, such as a precipitation type, a filtration type, and a compression type, may be used. The solvent oil recovered from the dehydrated slurry is returned as a recycle oil to the mixing section 2. The solvent oil returned to the mixing section 2 is reused for adjustment of the slurry in the mixing section 2.

Drying Step

Subsequently, the drying section 5 heats the cake separated in the solid-liquid separation section 4 to separate the solvent oil from the cake. Consequently, the cake is formed into powdery upgraded coal. The solvent oil recovered from the cake is returned as a recycle oil to the mixing section 2. The drying section 5 is configured of a dryer and a gas cooler. The dryer heats an object while continuously conveying the object within the dryer. For example, usable dryers include a steam tube dryer including a plurality of heating steam tubes that are arranged in an axial direction on an inner surface of a drum.

The cake is heated in the dryer to evaporate the solvent oil in the cake. The evaporated solvent oil is transferred from the dryer to the gas cooler by a carrier gas. The solvent oil transferred to the gas cooler is condensed and collected in the gas cooler, and returned as a recycle oil to the mixing section 2.

Molding Step

Subsequently, the molding section 6 pressure-molds the powdery upgraded coal produced in the drying section 5 without adding and/or mixing a binder by a molding machine having many pockets on its surface, and thus produces a molded solid fuel in a form of briquettes. In this step, a coolant is sprayed onto the surface of the molding machine to cool the surface, so that the surface temperature of the molding machine is maintained to 100° C. or lower. The surface temperature of the molding machine is thus intentionally maintained to 100° C. or lower, and thereby a temperature difference between the surficial portion and the inside of the molded solid fuel is decreased. Consequently, occurrence of strain is suppressed in the molded solid fuel, so that a molded solid fuel having high strength is provided. The lower limit of the surface temperature of the molding machine being cooled is, but not limited to, normal temperature, i.e., about 20 to 25° C. Actually, if the surface temperature is too different from the temperature of the molding material, strain is rather caused; hence, a preferred lower limit of the surface temperature is about 60° C. When the temperature of the molding material is 100° C. or higher, the surface temperature of the molding machine is preferably about 80 to 100° C.

The coolant is preferably sprayed onto the surface of the molding machine to cool the surface in order to maintain the surface temperature of the molding machine to 100° C. or lower. Water is preferably sprayed as the coolant onto the surface of the molding machine. The reason for this is as follows: Water as the coolant has high specific heat and high evaporative latent heat and thus has a high cooling effect, and furthermore is inexpensive. In addition, water improves nipping of the upgraded-coal powder in the molding section. For the water spray amount, weight percentage of the amount of sprayed water to the amount of production of the molded solid fuel is 0.1% or more. This is because if the weight percentage is less than 0.1%, the cooling effect on the surface of the molding machine is not sufficiently provided. The upper limit of the water spray amount is about 5.0%. The weight percentage of the amount of sprayed water to the amount of production of the molded solid fuel is preferably 0.2 to 2.0%.

The molding machine includes a double-roll molding machine. The double-roll molding machine has a structure where two cylindrical rolls are provided in a horizontally adjacent manner, and each roll rotates in a direction from the upside to its adjacent point. Many almond-shaped pockets (molds) as formworks for ellipsoidal briquettes are provided on a peripheral surface of each roll. Such pockets are arranged in a manner of being synchronized between the two rotating rolls. The peripheries of the two rolls of the double-roll molding machine are not in contact with each other, and a gap of, for example, about 2 mm still exists between the adjacent points as the nearest points.

Figure 2:
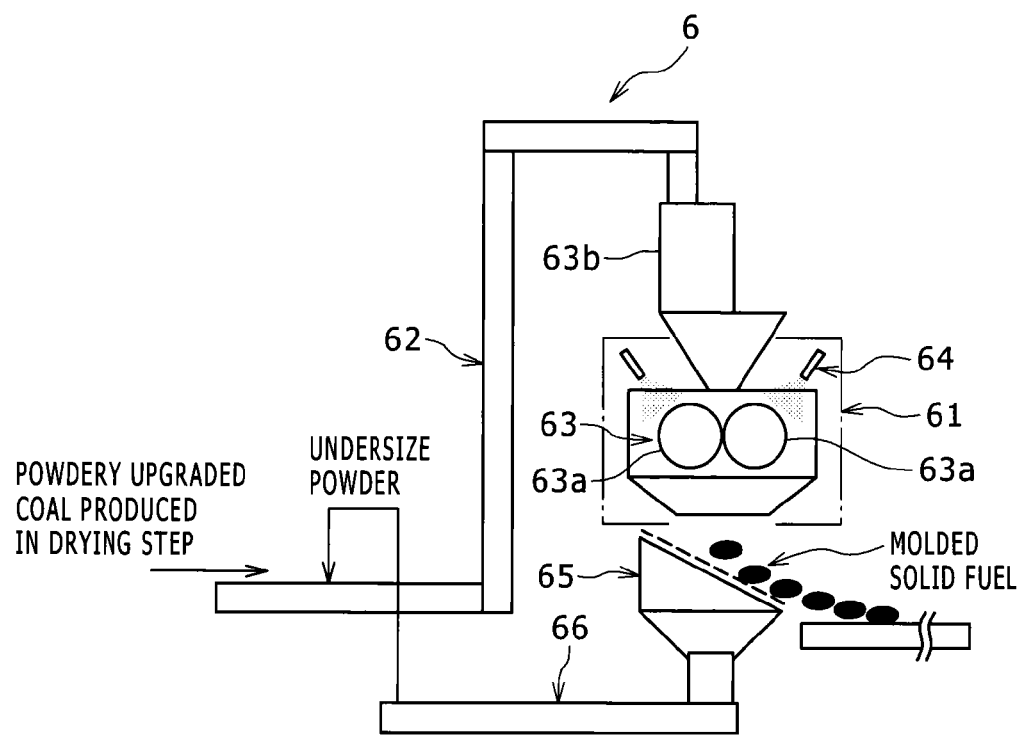
FIG. 2 is a schematic illustration of an exemplary configuration of a molding section in FIG. 1.

FIG. 2 is a schematic illustration of an exemplary configuration of the molding section in FIG. 1.

As illustrated in FIG. 2, the molding section 6 is configured of a double-roll molding machine 63 having a material supply unit (material clipping unit) 63b; a water spray unit 64 that sprays water as a coolant onto the surface of each roll 63a (the surface having many pockets) of the double-roll molding machine 63; a material supply line 62 along which the powdery upgraded coal as a molding material is carried from the drying section 5 to the double-roll molding machine 63; a sieving unit 65 that sieves the molded solid fuel provided from the double-roll molding machine 63 and the powdery upgraded coal as a non-molded material, and separates them from each other; a recycle line 66 along which the powdery upgraded coal as undersize powder provided from the sieving unit 65 is returned to the material supply line 62; and a semi-sealed molding chamber 61 that accommodates the double-roll molding machine 63 and the water spray unit 64, and has an opened carry-in part for the powdery upgraded coal provided from the drying section 5 and an opened carry-out part for the molded solid fuel molded in the double-roll molding machine 63. The water spray unit 64 has a plurality of water spray nozzles that each spray water in a mist form onto the surface of each roll 63a of the double-roll molding machine 63.

The molding section 6 configured in this way is designed such that the surface of each roll 63a of the double-roll molding machine 63 is cooled by the water spray unit 64 to maintain the surface temperature of the roll 63a to 100° C. or lower. The inside of the molding chamber 61 is preferably humidified to maintain the humidity in the molding chamber 61 to 85% or more. In such a case, an appropriate humidifying tool such as a humidifier may be provided in the molding chamber 61 in place of the water spray unit 64. Higher humidity in the molding chamber 61 is preferred, and the upper limit of the humidity may be 100%.

In this way, the surface temperature of the roll 63a is maintained to 100° C. or lower, thereby the molded solid fuel has a small temperature difference between the surficial portion and the inside thereof compared with the case where no coolant is sprayed, leading to suppression of occurrence of strain. The humidity in the molding chamber 61 is maintained to 85% or more, thereby the molded solid fuel is suppressed in water evaporation, and thus has a small difference in moisture percentage between the surficial portion and the inside thereof, leading to homogenization of the molded solid fuel. As a result, a molded solid fuel having high strength can be provided.

The humidified powdery upgraded coal provided from the sieving unit 65 is returned to the material supply line 62 along the recycle line 66, and is mixed as a molding material to the powdery upgraded coal provided from the drying section 5; hence, the molding material can be more easily humidified before being supplied to the double-roll molding machine 63. Furthermore, water is sprayed onto the surface of the roll 63a by the water spray unit 64. It is thereby possible to improve nipping of the upgraded-coal powder between the rolls 63a, and suppress noise and/or vibration in the double-roll molding machine 63 (explosion occurring when air is exhausted from the pocket of the roll 63a and/or roll vibration).

EXAMPLES

A molded solid fuel is experimentally manufactured through pressure molding in order to check the effect of water spray in the molding step.

Example 1

Mulia coal, which is Indonesian brown coal, was used as low-grade coal as a material. The Mulia coal was pulverized by a hummer crusher in the pulverization section 1 and was formed into particles having a maximum particle size of 3 mm or less and an average particle size of about 0.5 mm. Such pulverized low-grade coal was subjected to separation treatment of dust coal, so that dust coal particles having an average particle diameter of about 0.1 mm or less were removed. The mixing section 2 then mixed the low-grade coal, from which the dust coal had been removed, and kerosene as the solvent oil, and thus produced a slurry. In such mixing, a weight ratio of the pulverized low-grade coal to the solvent oil was adjusted to 1.7 with reference to dried or moisture-free coal. The slurry produced in this way was sequentially subjected to the steps performed by the dehydration section 3, the solid-liquid separation section 4, and the drying section 5 to produce powdery upgraded coal.

The produced powdery upgraded coal was carried into the molding section 6 having the configuration illustrated in FIG. 2. Water was sprayed onto the surface of each roll 63a of the double-roll molding machine 63 by the water spray unit 64 to maintain the surface temperature of the roll 63a to 90° C., and maintain to 99% humidity in the molding chamber 61, specifically humidity in the periphery of each roll 63a of the double-roll molding machine 63. The molding step was performed to produce the molded solid fuel.

Table 1 shows the results. In Table 1, roll surface temperature was measured using a non-contact thermometer. In addition, "humidity under molding machine" refers to a measurement of humidity in a space between the rolls 63a of the double-roll molding machine 63 and the sieving unit 65 below the rolls 63a. As described above, "water spray amount" refers to the weight percentage of the amount of sprayed water to the amount of production of the molded solid fuel. Humidity and moisture percentage of "molding material" were measured on the molding material at a place just before the material supply unit 63b on the material supply line 62. Temperature and moisture percentage of "recycle powder" were measured on the powdery upgraded coal as undersize powder provided from the sieving unit 65. The roll 63a has a diameter of 1000 mm, and each pocket provided on the surface of the roll 63a has a volumetric capacity of 15 cm$^3$.

TABLE 1

| Classification | | Example 1 | Comparative example 1 | Comparative example 2 | Comparative example 3 |
|---|---|---|---|---|---|
| Water spray | | Performed | Performed | Not performed | Oil spray |
| Roll surface temperature | | 90° C. | 110° C. | 115° C. | 115° C. |
| Humidity under molding machine | | 99% | 70% | 30% | 30% |
| Water spray amount | | 1.0% | 0.05% | — | 0.3% |
| Molding material | Temperature | 103° C. | 109° C. | 116° C. | 114° C. |
| | Moisture percentage | 5.2 mass % | 3.7 mass % | 3.1 mass % | 3.5 mass % |
| Recycle powder | Temperature | 89° C. | 100° C. | 110° C. | 97° C. |
| | Moisture percentage | 6.8 mass % | 3.8 mass % | 3.4 mass % | 3.6 mass % |
| Vibration and/or noise in molding machine | | Not occurred | Not occurred | Occurred | Not occurred |
| Moisture percentage (mass %) of solid fuel | | 4.7 | 2.8 | 2.0 | 2.4 |
| Crushing strength of solid fuel (kgf) | | 105 | 72 | 54 | 78 |
| Density of solid fuel (kg/m$^3$) | | 1.24 × 10$^3$ | 1.17 × 10$^3$ | 1.07 × 10$^3$ | 1.19 × 10$^3$ |

As shown in Table 1, in Example 1, a molded solid fuel having a high crushing strength of 105 kgf (≈1030 N), which is about two times higher than that in the case where no water spray is performed (comparative example 2 described later).

Comparative Example 1

Powdery upgraded coal produced in the same way as in Example 1 was carried into the molding section 6 having the configuration illustrated in FIG. 2, and was subjected to the molding step. The molding condition of the comparative example 1 was different from that of Example 1 in that the water spray amount was 0.05% (Example 1: 1.0%), roll surface temperature after water spray was 110° C. (Example 1: 90° C.), and humidity under molding machine after water spray was 70% (Example 1: 99%).

In the comparative example 1, such molding condition items do not satisfy the requirements defined in the invention (water spray amount: 0.2% or more, roll surface temperature: 100° C. or lower, and humidity in the molding chamber: 85% or more). Hence, in the comparative example 1, the produced molded solid fuel has a considerably low crushing strength compared with the crushing strength in Example 1, i.e., 72 kgf (≈706 N), about 70% of that in Example 1.

Comparative Example 2

Powdery upgraded coal produced in the same way as in Example 1 was carried into the molding section 6 having the configuration illustrated in FIG. 2, and was subjected to the molding step without water spray and recycle of undersize powder.

In the comparative example 2 without water spray, the roll surface temperature greatly exceeds 100° C. or lower defined in the invention, and the humidity in the molding chamber 61 falls much below 85% or more defined in the invention. Hence, the produced molded solid fuel has a crushing strength of 54 kgf (≈530 N), about 50% of the crushing strength in Example 1. In addition, in the comparative example 2, since no water is sprayed onto the roll surface, noise and/or vibration occur in the double-roll molding machine 63.

Comparative Example 3

Powdery upgraded coal produced in the same way as in Example 1 was carried into the molding section 6 having the configuration illustrated in FIG. 2, and was subjected to the molding step while oil spray was performed in place of water spray (but recycle of undersize powder was not performed). The sprayed oil was a typical low-viscosity machine oil. The oil has low specific heat and evaporative latent heat lower than water.

In the comparative example 3, the roll surface temperature and the humidity in the molding chamber do not satisfy the requirements defined in the invention, and the produced molded solid fuel has a crushing strength that is about 75% of that in Example 1.

As described hereinbefore, according to the method of manufacturing the molded solid fuel of the invention, a molded solid fuel having high strength can be produced from low-grade coal.

Although the invention has been described in detail with reference to specific embodiments, it should be understood by those skilled in the art that various alterations and modifications thereof may be made without departing from the spirit and the scope of the invention.

The present application is based on Japanese patent application (JP-2013-091396) filed on Apr. 24, 2013, the content of which is hereby incorporated by reference.

INDUSTRIAL APPLICABILITY

The invention is suitable for producing a molded solid fuel from low-grade coal such as brown coal and subbituminous coal.

LIST OF REFERENCE SIGNS

1 Pulverization section
2 Mixing section
3 Dehydration section
4 Solid-liquid separation section
5 Drying section
6 Molding section
61 Molding chamber
62 Material supply line
63 Double-roll molding machine
63a Roll
63b Material supply unit
64 Water spray unit
65 Sieving unit
66 Recycle line
100 Manufacturing apparatus of molded solid fuel

The invention claimed is:

1. A method of manufacturing a molded solid fuel, the method comprising:
    a pulverization step of pulverizing low-grade coal;
    a mixing step of mixing the pulverized low-grade coal and a solvent oil to produce a slurry;
    a dehydration step of heating and dehydrating the slurry to produce a dehydrated slurry;
    a solid-liquid separation step of separating the solvent oil from the dehydrated slurry to produce a cake;
    a drying step of heating the cake to further separate the solvent oil from the cake to produce powdery upgraded coal; and
    a molding step of pressure-molding the powdery upgraded coal by a molding machine without adding and/or mixing a binder,
    wherein in the molding step, a coolant is sprayed onto a roll surface of the molding machine, to cool the surface to a degree sufficient that a roll surface temperature of the molding machine is maintained at 100° C. or lower,
    wherein in the molding step, the molding machine is accommodated in a molding chamber having an opened carry-in part for the powdery upgraded coal produced in the drying step and an opened carry-out part for the molded solid fuel provided from the molding machine, and humidity in the molding chamber is maintained to 85% or more.

2. The method of manufacturing a molded solid fuel according to claim 1, wherein water is used as the coolant.

3. The method of manufacturing a molded solid fuel according to claim 1, wherein in the molding step, the coolant spray device is accommodated in the molding chamber, and the coolant is sprayed onto the surface of the molding machine.

4. The method of manufacturing a molded solid fuel according to claim 1, wherein after the molding step, the molded solid fuel provided from the molding machine and the powdery upgraded coal as a non-molded material are sieved and separated from each other, and the powdery upgraded coal as undersize powder in such sieving is returned to the material supply line.

5. The method of manufacturing a molded solid fuel according to claim 4, wherein after the molding step, the molded solid fuel provided from the molding machine and the powdery upgraded coal as a non-molded material are sieved and separated from each other, and the powdery upgraded coal as undersize powder in such sieving is returned to the material supply line.

6. A method of manufacturing a molded solid fuel, the method comprising:

a pulverization step of pulverizing low-grade coal;

a mixing step of mixing the pulverized low-grade coal and a solvent oil to produce a slurry;

a dehydration step of heating and dehydrating the slurry to produce a dehydrated slurry;

a solid-liquid separation step of separating the solvent oil from the dehydrated slurry to produce a cake;

a drying step of heating the cake to further separate the solvent oil from the cake to produce powdery upgraded coal; and a molding step of pressure-molding the powdery upgraded coal by a molding machine without adding and/or mixing a binder, wherein in the molding step, a coolant is sprayed onto a roll surface of the molding machine, to cool the surface to a degree sufficient that a roll surface temperature of the molding machine is maintained at 90° C. or lower, wherein in the molding step, the molding machine is accommodated in a molding chamber having an opened carry-in part for the powdery upgraded coal produced in the drying step and an opened carry-out part for the molded solid fuel provided from the molding machine, and humidity in the molding chamber is maintained to 85% or more.

7. A method of manufacturing a molded solid fuel, the method comprising:

a pulverization step of pulverizing low-grade coal;

a mixing step of mixing the pulverized low-grade coal and a solvent oil to produce a slurry;

a dehydration step of heating and dehydrating the slurry to produce a dehydrated slurry;

a solid-liquid separation step of separating the solvent oil from the dehydrated slurry to produce a cake;

a drying step of heating the cake to further separate the solvent oil from the cake to produce powdery upgraded coal at an elevated temperature; and a molding step of pressure-molding the powdery upgraded coal by a molding machine without adding and/or mixing a binder, wherein in the molding step, a coolant is sprayed onto a roll surface of the molding machine, to cool the surface to a degree sufficient that a roll surface temperature of the molding machine is maintained at a temperature no greater than the elevated temperature of the powdery upgraded coal, wherein in the molding step, the molding machine is accommodated in a molding chamber having an opened carry-in part for the powdery upgraded coal produced in the drying step and an opened carry-out part for the molded solid fuel provided from the molding machine, and humidity in the molding chamber is maintained to 85% or more.

8. The method of manufacturing a molded solid fuel according to claim 1, wherein the humidity in the molding chamber is maintained to 99% or more.

9. The method of manufacturing a molded solid fuel according to claim 6, wherein the humidity in the molding chamber is maintained to 99% or more.

10. The method of manufacturing a molded solid fuel according to claim 7, wherein the humidity in the molding chamber is maintained to 99% or more.

* * * * *